United States Patent Office 3,192,218
Patented June 29, 1965

3,192,218
DIMERIZATION OF STYRENE AND VINYL PYRIDINES IN THE PRESENCE OF ATOMIC HYDROGEN
Paul W. Solomon, Bartlesville, Okla., assignor to Phillips Petroleum Company, a corporation of Delaware
No Drawing. Filed Nov. 1, 1960, Ser. No. 66,424
4 Claims. (Cl. 260—290)

This invention relates to the preparation of saturated dimers of vinyl compounds. In one of its aspects, the invention relates to liquid phase dimerization of vinyl compounds. In another aspect, this invention relates to the use of a high temperature when dimerizing compounds in the liquid phase. Another aspect of this invention is the preparation of means to carry out the dimerization. A further aspect of this invention is in the preparation of the atomic hydrogen to be employed in the dimerization reaction. In a still further aspect of this invention, it relates to the dimerization of vinyl compounds wherein the vinyl group is not adjacent another vinyl, carbonyl, carboxy, thionyl or dithionyl group.

In the normal polymerization processes, dimerization results in an unsaturated product and when polymerization is permitted to continue, quite high molecular weight polymers are usually formed. Thus, a method is desired wherein a continued process is carried out so as to achieve optimum yields but without formation of higher polymers.

In the past, dimers were formed by the bombardment of solid compounds with thermally produced hydrogen. However, such a method was limited since extremely low temperatures had to be employed. Also, the solid phase of the monomer had to be employed where the hydrogen used was thermally generated. Thus, the previous methods of forming dimers of vinyl compounds have been limited due to economical and safety factors. Therefore, a method is desired which would allow the dimerization and formation of saturated dimers while at the same time avoid the risk of thermally generated hydrogen and allow the use of higher temperatures.

I have found that by utilizing a liquid phase operation with atomic hydrogen, vinyl substituted compounds can be selectively dimerized in a manner which gives adequate yields without employing the low temperatures previously required and which further avoids the use of thermally generated hydrogen, and which can be continued for a longer period of time.

It is an object of this invention to produce dimers of vinyl compounds. It is another object of this invention to produce selective polymerization of vinyl compounds. It is another object of this invention to selectively polymerize vinyl compounds so as to produce saturated dimers of vinyl compounds. Another object of this invention is to provide atomic hydrogen which is useful in forming selectively polymerized dimers.

Other aspects, objects, and the several advantages of this invention are apparent from a study of this disclosure and the appended claims.

While vinyl compounds will generally allow some dimer formation, typical vinyl compounds suitable for use in the process of this invention include 1-olefins having from about 3 to about 20 carbon atoms; straight-chain and branched-chain type olefins are included. Suitable specific compounds are:

Vinyl cyclopentane
2-methyl-vinyl cyclopentane
3-methyl-vinyl cyclopentane
Vinyl cyclohexane
2-methyl-vinyl cyclohexane
3-methyl-vinyl cyclohexane
4-methyl-vinyl cyclohexane
2,3-dimethyl-vinyl cyclohexane
2,4-dimethyl-vinyl cyclohexane
3,5-dimethyl-vinyl cyclohexane
Styrene
3-methyl-vinyl benzene
4-phenyl-1-butene
2-ethyl styrene
3-ethyl styrene
4-ethyl styrene
6-phenyl-1-hexene
2-phenyl-3,3-dimethyl-1-butene
2-cyclohexyl-1-hexene
2-methyl-5-vinyl pyridine
3-vinyl pyridine
5-vinyl pyridine
4-methyl-5-vinyl pyridine, and the like.

However, while acyclic conjugated structures are not generally suitable, such as where the compound has the formula

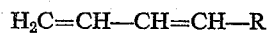
$$H_2C=CH-CH=CH-R$$

it should be noted that not all conjugated structures are detrimental to the process of this invention. In fact, the conjugation present in the benzene ring has been found highly beneficial. Also, heterocyclic compounds having a conjugated system, such as vinylpyridine, have been found operative in the process of the present invention.

Thus according to the present invention, I have found that essentially only dimers are produced when vinyl substituted compounds as described above are reacted in liquid phase with atomic hydrogen under subatmospheric pressure and at relatively high temperatures.

Atomic hydrogen to be used in the present invention can be derived from any of the known sources for producing the same. However, such sources while useful may not be desirable due to safety considerations. For example, thermally generated atomic hydrogen can be employed but due to dangers involved in thermally generating atomic hydrogen over a liquid hydrocarbon phase would not be practical. As an illustration, and not to be considered limiting, the atomic hydrogen herein employed was fed to the reactor after passing through the high frequency fields in a microwave resonance cavity at the rate of 30 gaseous cc. per minute. A glow discharge is produced in the hydrogen, indicative of atomic hydrogen production. The plasma thus produced, $H_2.H$, was then transmitted to the reactor by way of a specially cleaned Pyrex tube. Atomic hydrogen thus prepared is suitable for use in the dimerization process and is much safer than thermally generated hydrogen.

The Pyrex tube which is used to conduct the hydrogen to the reactor, must be cleaned so as to make same noncatalytic and thus avoid contamination of the hydrogen and the reactor. Such desired cleaning is effected in four steps consisting of immersion for 15 minutes in alcoholic potassium hydroxide, rinsing with distilled water, immersing in 1:1 by volume of nitric acid in water, and rinsing in distilled water and drying in an evacuated oven.

In carrying out the process of this invention, the liquid starting material was placed in the reactor which was maintained in the temperature range about −60° C. to +60° C. but preferably within the range of −5 to 30° C. by means of a reflux condenser. In addition to the atomic hydrogen inlet line, the reactor was provided with a vent which led to a vacuum pump through a liquid nitrogen refrigerated trap. The entire system was evacuated to about 500 microns mercury pressure and the reaction continued for 7–10 hours so that sufficient product was available for evaluation. The pressure will be limited by the free path of the hydrogen atoms and therefore will generally not be above about 30 mm. mercury pressure. Pressures to 100 mm. mercury could be tolerated with loss of efficiency in hydrogen utilization.

*Example I*

Eighty-five ccs. of styrene were placed in a reactor which was maintained at a temperature of about −5 to 20° C. and atomic hydrogen at subatmospheric pressures of about 10 microns to 30 mm. mercury pressure was introduced thereto. The reaction was continued about 7 to 10 hours. Upon concluding the reaction, there was recovered from the reactor 0.5 mol per 100 mols of hydrogen of diphenylbutanes and 3 mols ethylbenzene per 100 mols of hydrogen. About 50 percent of the diphenylbutane was the meso-2,3-diphenylbutane. Both dl-2,3-diphenylbutane and 1,4-diphenylbutane were identified in the product but quantitative estimation of their amounts was not attempted.

*Example II*

When the process was carried out in a manner similar to that described in Example I except 50 ccs. of 2-methyl-5-vinylpridine were used, the following products were recovered from the reactor based on 100 mols of hydrogen charged: 106 grams of solid polymethylvinylpyridine having a molecular weight of 1,050 (cryoscopic determination in benzene), 29 grams of liquid polymethylvinylpyridine of high viscosity, 73 grams (0.3 mol) of 1,4-bis[-6-methyl-3-pyridyl]-butane, and 3 mols of 2-methyl-5-ethylpyridine.

*Example III*

When the process was carried out in a manner similar to that described in Example I except 50 ccs. of 1-octene were used, 0.1 mol of $C_{16}$ paraffinic hydrocarbon and 2 mols of n-octane were recovered from the reactor based on 100 mols of hydrogen charged to the generator.

*Example IV*

When the process was carried out in a manner similar to that described in Example I except 50 ccs. of butyl acrylate were used, 760 grams of a sticky rubbery polymer and 3 mols of butyl propionate were recovered based on 100 mols of hydrogen charged to the generator.

"Selectively dimerizing" as used in the present invention indicates that saturated dimers are formed in preference to longer chain polymers normally found where vinylated compounds are undergoing reaction.

The results clearly show that conjugation retards the desired dimer reaction except conjugation with a benzene ring which appears to enhance the dimerization. Conjugation with a carbonyl group appears to inhibit the reaction and an alkyl chain attached to the vinyl group also appears to be retarding. The pyridine ring does not display the enhancement effect shown by the benzene ring.

While this invention is directed primarily to the production of dimers of dimerizable compounds, there is also produced therewith small amounts of compounds which can be considered as complexes of such dimers or which will be of higher chain length than the principal dimer compound formed. Since organic reactions do not generally go to one hundred percent completion, i.e., do not produce completely the desired product, these ancilliary compounds which are produced can be used to serve as starting material for the desired dimer product; for example, any polymers or complexes which are produced can be converted by pyrolysis, dehydrogenation, depolymerization or otherwise to the monomer and then by carrying out the above recited reaction used to produce further amounts of the corresponding dimer.

The products of this invention are useful as intermediates in organic synthesis, as extenders for plastics, as solvents, as neutron moderators and coolants for atomic reactors, as additives for motor fuels, as base materials in formulating adhesives, as vehicles for spraying insecticides, herbicides, defoliants, as moldable plastics, as rubber extenders, as vehicle and coating agents in various compositions for coating, impregnating or incapsulating cloth, paper, leather, metal, plastic and ceramic materials.

Reasonable variation and modification are possible within the scope of the foregoing disclosure and the appended claims to the invention, the essence of which is directed to a process for selectively dimerizing vinyl compounds so as to form saturated dimers thereof by the reaction of vinyl compounds in liquid phase with atomic hydrogen under subatmospheric pressure at relatively high temperatures.

I claim:

1. A process of selectively dimerizing vinyl compounds which comprises reacting in liquid phase at a temperature in the range of about −60° C. to about +60° C. with atomic hydrogen a liquid compound selected from the group consisting of

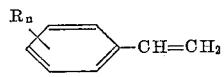

and

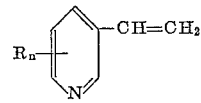

where R is lower alkyl and $n$ is an integer selected from the group consisting of 0 and 1.

2. A process of selectively dimerizing vinyl compounds which comprises reacting in liquid phase at a temperature in the range of about −5° C. to about 30° C. at a pressure of about 0.01 to about 100 mm. Hg with atomic hydrogen a compound selected from the group consisting of

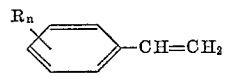

and

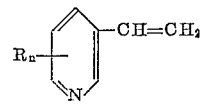

where R is lower alkyl and $n$ is an integer selected from the group consisting of 0 and 1.

3. A process of dimerizing which comprises reacting styrene in liquid phase at a temperature in the range of about −60° C. to about 60° C. with atomic hydrogen.

4. A process of dimerizing which comprises reacting 2-methyl-5-vinylpyridine in liquid phase at a temperature in the range of about −60° C. to about 60° C. with atomic hydrogen.

References Cited by the Examiner

UNITED STATES PATENTS

| | | | |
|---|---|---|---|
| 2,404,056 | 7/46 | Gorin et al. | 260—631.1 |
| 2,806,072 | 9/57 | Cohen et al. | 260—631.1 |
| 2,870,217 | 1/59 | Toland | 260—631.1 |
| 2,898,387 | 8/59 | Teter | 260—667 |
| 2,934,578 | 4/60 | Scheer et al. | 260—683.9 |
| 2,935,513 | 5/60 | Takeba et al. | 260—290 |
| 2,956,086 | 10/60 | Frank et al. | 260—668 |
| 2,956,087 | 10/60 | Frank et al. | 260—670 |

FOREIGN PATENTS 775,384    5/57    Great Britain.

OTHER REFERENCES

Chang et al.: J. Am. Chem. Soc., volume 81, pages 2060–4 (1959).

(Other references on following page)

Klingsberg: "Pyridine and Deriv.," part two, pages 215–216, 263 (1961).

Lodenburg: Beilstein (Handbuch, 4th edition), volume 23, page 205 (1936).

Magnus et al.: J. Am. Chem. Soc., volume 78, pages 4127–8 (1956).

Muller et al.: Chem. Abstracts, vol. 44, col. 1941 (1950).

Tuot et al.: Chem. Abstracts, vol. 42, col. 5836 (1948).

Vander Zanden et al.: Chem. Abstracts, volume 51, column 11301 (1957).

Wibaut et al.: Rec. Trav. Chim., volume 60, pages 119–121 (1941).

IRVING MARCUS, *Primary Examiner.*

DUVAL T. McCUTCHEN, WALTER A. MODANCE,
*Examiners.*